United States Patent [19]

Gutbrod

[11] Patent Number: 4,820,946
[45] Date of Patent: Apr. 11, 1989

[54] ELECTROMAGNETIC BRAKE

[75] Inventor: Kenneth J. Gutbrod, Lisbon, Wis.

[73] Assignee: Harnischfeger Corporation, Brookfield, Wis.

[21] Appl. No.: 195,929

[22] Filed: May 19, 1988

[51] Int. Cl.$^4$ .............................. H02K 7/102
[52] U.S. Cl. .................. 310/77; 188/71.7; 188/72.3
[58] Field of Search .......... 310/76, 77, 78, 92, 310/93, 100; 188/71.7, 71.9, 214, 196 R, 196 M, 196 B, 196 BA, 72.3; 192/111 R, 111 B, 70.25

[56] References Cited

U.S. PATENT DOCUMENTS

| | | | |
|---|---|---|---|
| 2,620,901 | 12/1952 | Stearns | 310/77 |
| 2,700,439 | 1/1955 | Hodgson | 188/171 |
| 3,261,431 | 7/1966 | Kershner et al. | 188/138 |
| 3,554,335 | 1/1971 | Ritter | 188/171 |
| 3,708,039 | 1/1973 | Germer | 188/62 |
| 4,476,965 | 10/1984 | Brown, Jr. et al. | 188/171 |

Primary Examiner—Patrick R. Salce
Assistant Examiner—Judson H. Jones
Attorney, Agent, or Firm—Richard C. Ruppin

[57] ABSTRACT

An electromagnetic brake is disclosed in which a brake spring applies compressive force to an armature plate and friction discs to apply the brake. Electrical energization of a coil creates an electromagnetic force on the armature plate in a direction opposite to the braking force on the spring to move the armature plate and spring away from the friction discs and release the brake. A brake adjustment and release mechanism threadably rotates a disc against the spring to increase its compressive force against the armature plate and friction discs to adjust the spring braking force when the discs wear. The mechanism also can be rotated against a cam surface to move the armature in a direction away from the friction discs and against the spring to release the brake for purposes such as maintenance when the brake is not in normal operation.

12 Claims, 2 Drawing Sheets

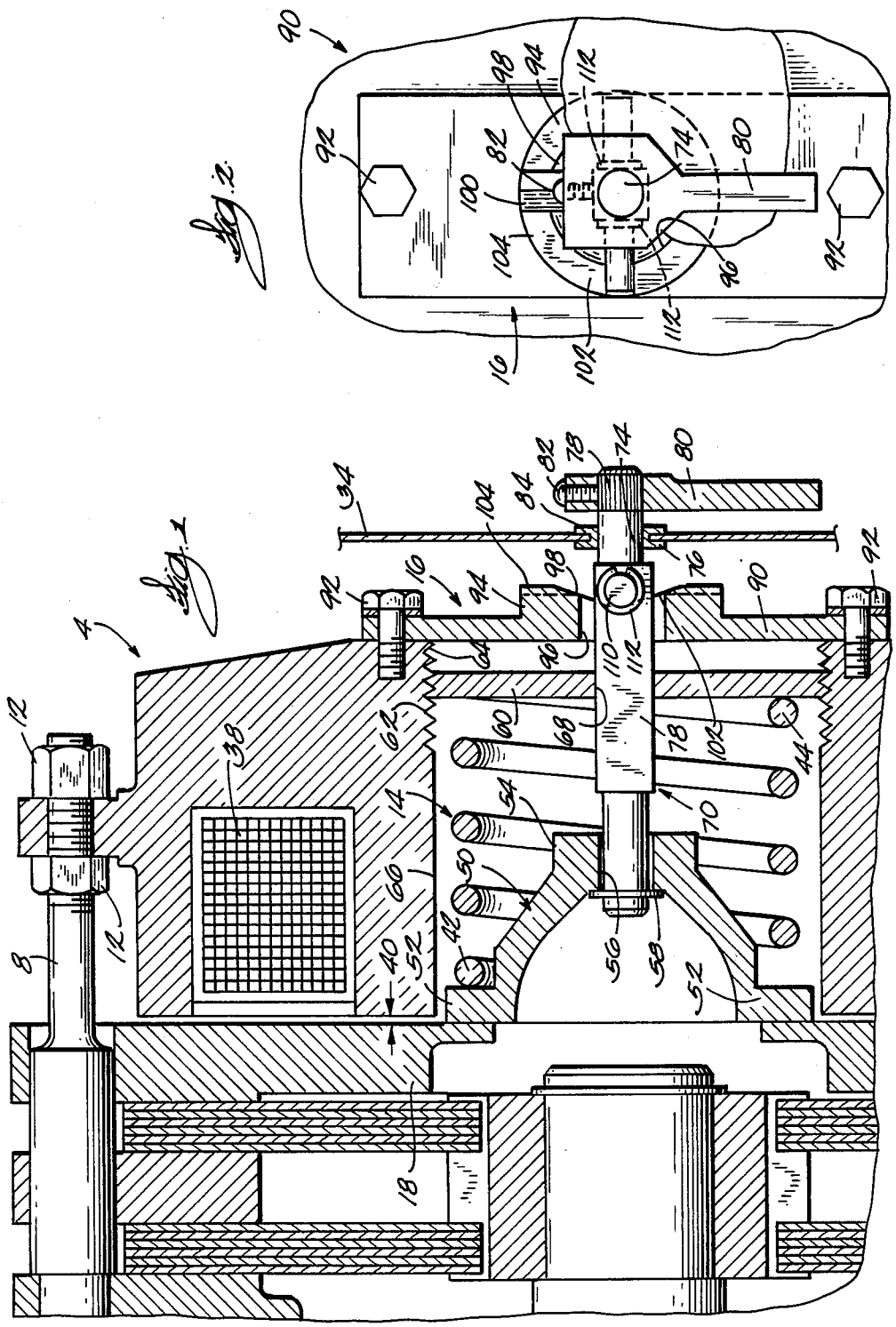

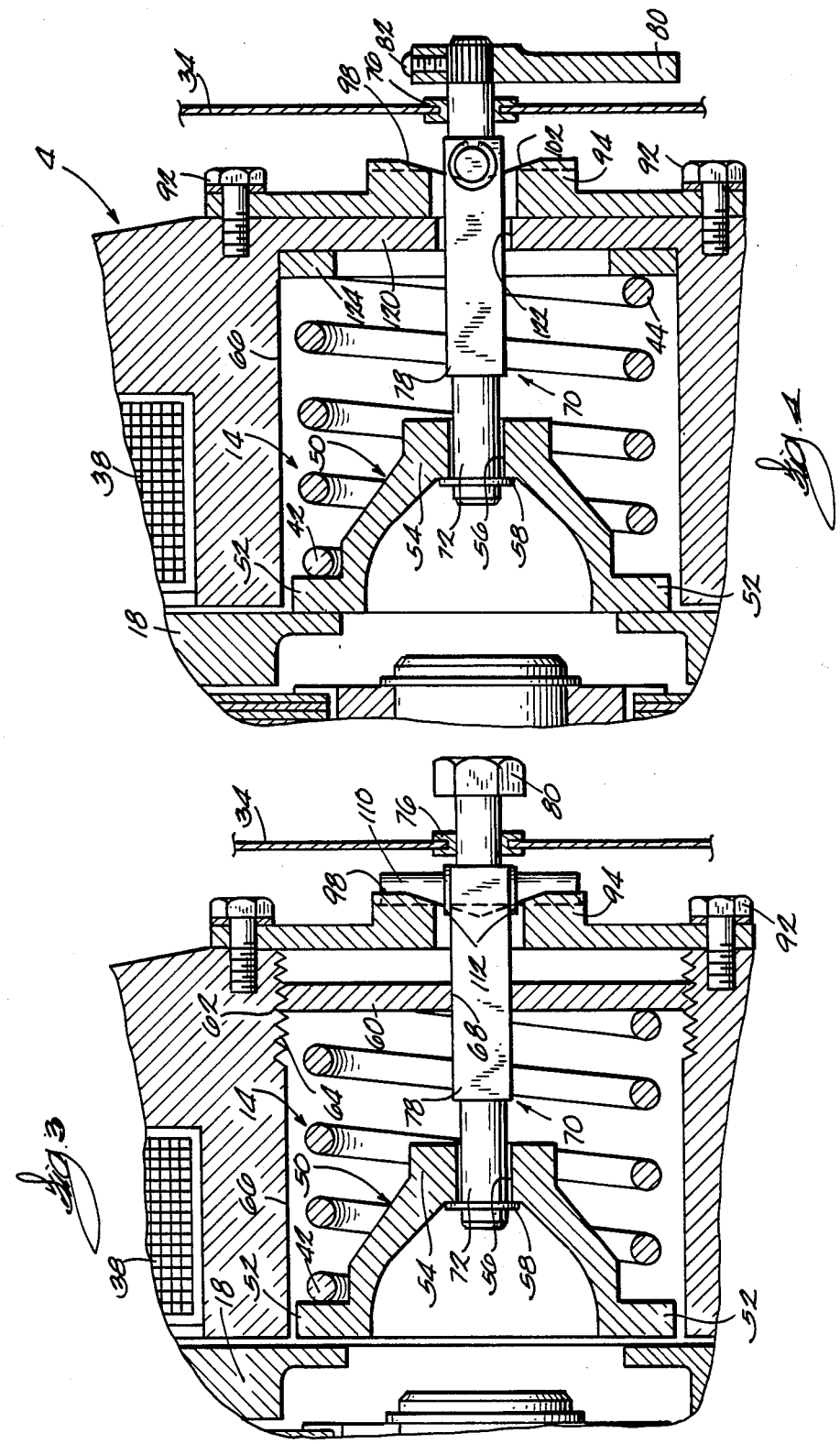

ELECTROMAGNETIC BRAKE

FIELD OF THE INVENTION

This invention relates to an electromagnetic brake typically used in industrial applications in which electromagnetic force is used to release the brake during its normal operation. More particularly, the invention relates to a mechanism for adjusting the braking force of the brake and mechanically releasing the brake for purposes such as maintenance.

BACKGROUND OF THE INVENTION

Electromagnetic brakes of the type disclosed herein utilize spring means for applying compressive braking force to a non-rotatable armature and friction discs mounted on a rotatable shaft. Typically, the braking action prevents rotation of a drive means and a load driven by the drive means. The braking force is released by an electromagnetic force which causes compression of the brake spring and retraction of the spring away from the armature to release the spring's force on the armature and friction discs. After repeated operations of the brake, the friction discs will wear and become thinner. This permits the brake spring to expand and relax so that the compressive force of the spring on the armature and friction discs decreases. After sufficient wear of the friction discs, the brake spring force becomes inadequate to provide a minimum stopping and holding torque. If the friction discs are still usable, an adjustment is made on the brake spring to restore its compressive force on the armature and friction discs. If the friction discs must be replaced or if any other maintenance work must be done on the electromagnetic brake requiring release of braking force, the brake spring is moved to cause its release of force on the armature and friction discs.

One approach to adjusting the force of the brake spring is to provide, as part of the electromagnetic brake device, a threaded member which can be rotated against the spring brake or against other means engaging the spring. Rotation of the threaded member adjusts the compression of the spring in the direction of the armature and friction discs and thereby adjusts the spring braking force, i.e., the stopping and holding torque of the brake spring.

Approaches to release of the brake spring force and holding the spring released vary. The brake device may be partially disassembled to remove the brake spring. A threaded bolt may be inserted into a member bearing against the spring and the member moved against the spring by the bolt in a brake releasing direction. Lever and cam mechanisms may also be used to retract a member bearing against the spring in a brake releasing direction.

A drawback of presently known brake adjustment and releasing mechanisms is that no single mechanism is capable of both adjusting the brake spring force and also releasing the brake spring force entirely when necessary. Another problem is that many mechanisms, either of the adjustment or release type, are bulky and cumbersome to operate or require a certain amount of disassembling of the brake mechanism to provide the brake adjustment or release.

SUMMARY OF THE INVENTION

It is a general object of this invention to provide an electromagnetic brake having a relatively simple mechanism for adjusting the braking force of the brake and releasing the brake without application of electromagnetic force.

The invention includes an electromagnetic brake in which friction disc means and an armature face each other and are engageable in an axial direction. A brake spring is positioned axially for providing braking force to bring the friction disc means and armature together to effect a braking action. Electromagnetic means applies magnetic force to the armature in a direction opposing the force of the brake spring to compress the spring in an axial direction away from the armature to effect a brake release action.

A frame supports the armature, the electromagnetic means, and a guide means and has an axially disposed internally threaded cylindrical portion. Rod means is provided and has a length positioned axially and is movable in axial directions. The rod means is also rotatable about the axis and has an end rotatably affixed to the guide means. The guide means is positioned between the armature and the brake spring and compressively engages the brake spring at an axial end of the latter. The guide means transfers braking force of the spring to the armature in a first axial direction and is movable to apply force in an opposite second axial direction to move the brake spring away from the armature to the brake release position. Movement of the guide means is in response to electromagnetic force moving the armature during normal brake release operation of the brake or in response to mechanical moving force of the attached rod means in direction away from the armature.

A circular disc engages the brake spring at the other axial end of the brake spring and has an outer threaded periphery threadably engaged with the threaded cylinder of the frame. Threaded rotation of the disc moves the disc axially and thereby adjusts the force of the brake spring applied to the armature. The circular disc also has an opening through which the rod means freely extends and engages the disc. The disc opening and the cross-section of the rod means at the location of their engagement are of a similar non-circular shape so that rotation of the rod means rotates the disc and causes axial movement of the disc.

Due to the compressive engagement of the guide means with the brake spring, the guide means cannot be rotatably moved. However, since the rod means is rotatable relative to the guide means, the rod means can nevertheless be rotated to threadably rotate the circular disc and adjust the compressive force on the brake spring.

A cam means is provided to enable releasing of the brake and holding it in a released position without use of the electromagnetic means. The cam means includes a cam plate mounted on the frame adjacent the rod means and having a cam surface with a first area axially toward the brake spring and guide means and a second area axially away from the brake spring and guide means. A cam follower is mounted on the rod means and moves along the cam surface when the rod means is rotated so that the rod means is also moved in axial directions. Thus, movement of the cam follower to the second area of the cam surface moves the rod means and thereby the guide means in an axial direction which compresses the spring to the brake released position. When the cam follower is opposite the first cam surface area, it may be spaced from the cam surface. The amount of the spacing is indicative of the wear of the friction disc means and thus the need to replace the friction disc means.

BRIEF DESCRIPTION OF THE DRAWINGS

Further objects and advantages of the invention will appear when taken in conjunction with the accompanying drawings, in which:

FIG. 1 is a side sectional view, partially in cross-section, of an electromagnetic brake including the mechanism of the invention in a brake applied position;

FIG. 2 is a front elevational view of a portion of the mechanism shown in FIG. 1;

FIG. 3 is a side view partially in cross-section of the electromagnetic brake of FIG. 1 in a brake released position; and FIG. 4 is a side view, partially in cross-section, of another alternate embodiment of the invention.

DETAILED DESCRIPTION OF THE INVENTION

Referring generally to FIGS. 1-3, an electromagnetic brake 2 is shown as having a frame 4 comprising a coil casing 6 and stationary posts 8 extending from housing 10 which is part of a housing for a motor or an apparatus driven by the motor. Coil casing 6 is stationarily affixed to the stationary posts 8 by nuts 12 and contains a coil 38. The electromagnetic brake 2 is positioned about a longitudinal axis and also includes a brake spring 14, a stationary armature plate 18, a stationary compression plate 20, friction disc means 21 comprising revolving friction discs 22, 24, all positioned coaxially with the axis of the brake 2, and a brake release and adjustment mechanism 16. The friction disc means and the armature plate both have axially face surfaces which are engageable with each other. The friction discs 22, 24 have splined inner peripheries 26, 28 engaging a splined end 30 of a shaft 32. The shaft 32 is mechanically connected to either a drive motor or a load apparatus driven by the motor (not shown). The friction discs 22, 24 thus are mounted on the end of the shaft 30 and rotate with it in response to rotating movement of either the motor or the load. A cover 34 is positioned over the electromagnetic brake and is affixed to the housing 10 by bolts and nuts 36.

Due to their mounting on the stationary posts 8, the armature plate 18 and the compression plate 20 are stationary in that they do not rotate, however, they are slideable in an axially direction in response to either brake applying force of the brake spring 14 or brake releasing force of the coil 38. The electromagnetic brake 2 has a brake applied position in which the armature plate 18, in response to force of the brake spring, moves in an axial direction toward the friction discs 22 and 24 and applies force to hold the friction discs 22, 24 tightly between the armature plate 18, the stationary plate 20 and the housing 10 to thereby hold the shaft 32 and prevent the motor and its load from rotating. In this brake applied position, the armature plate 18 is spaced from the coil casing 6, by a gap of, for example, 1/32 of an inch. When it is desired to release the electromagnetic brake 2 so that the motor is free to rotate and drive the load, a voltage is applied to the terminals (not shown) of the coil 38. The voltage causes the coil to provide an electromagnetic field which produces a force pulling the armature plate in an axial direction opposite to the braking force of the brake spring 14 and into engagement with the coil casing 6. With the armature plate 18 held against the coil casing 4, the brake 2 is in a brake released position, and the friction discs 22 and 24 and thereby the shaft 32 are free to rotate. Removal of the voltage on the terminals of the coil 38 will again permit the brake spring 14 to expand in an axial direction toward the friction discs 22 and 24 and cause the armature plate 18 to clamp the friction discs 22 and 24 and brake and hold the motor or load.

When the brake 2 is applied, the material of the friction discs 22 and 24 will wear away. Over a period of time, the discs 22 and 24 will wear in an axial direction to cause their movement to the left and corresponding moving of the armature to the left relative to the view of FIG. 1. Consequently, the compressive braking force of the brake spring 14 against the armature becomes insufficient to provide the necessary braking and holding torque. This problem can be remedied, until the friction discs are worn beyond use, by increasing the compressive force of the brake spring 14 which is provided to the armature plate 18 to the value it had prior to the wearing of the discs.

Referring again to FIGS. 1-3, the brake adjustment and release mechanism 16 includes a guide means 50 axially aligned with the axis of the brake 2. The guide means 50 has a retaining shoulder 52 against which the brake spring 14 bears at its axial end 42 such that the guide means 50 is held immovable in a rotatable direction between the armature plate 18 and the spring 14. At the other axial end 44 of the brake spring 14, a circular disc 60 engages the spring 14 so that the spring 14 is retained and held between the guide means 50 and the circular disc 60. The disc 60 has a threaded outer periphery 62 in threaded engagement with a threaded portion 64 of a hollow cylindrical section 66 of the coil casing 6. Threaded rotation of the disc 60 moves it in axial directions in the cylindrical section 66. The disc 60 also has a centrally located opening of a non-circular, for example, rectangular, shape.

A rod means 70 is positioned axially partially within the cylindrical section 66 and is moveable both in axial directions and also rotatably about its lengthwise axis. The rod means 70 has a first cylindrical end 72 extending through an opening 56 in the center section 54 of guide means 50. The end 72 of the rod means is rotatable in the opening 56 and is affixed to the guide means by a suitable means such as a c-ring 58. The opposite second end 74 of the rod means extends through an opening 84 in the cover 34 which includes a sealing ring 76 surrounding the rod means end. A handle 80 for turning the rod means 70 is affixed to the second end 74 of the rod means by suitable means such as splines 78 and a set screw 82. The rod means 70 also has a non-circular cross-section portion 78 intermediate its first and second ends which extends through and engages the disc 60 in the opening 68. The non-circular cross-section portion 78 of the rod means in the area of its engagement with the opening 68 is preferably of the same shape, for example, rectangular, as the shape of the opening 68. The disc 60 is free to slide in axial directions on the portion 78 of the rod means. Since the rod means 70 is rotatably affixed to the guide means 50, even though the guide means 50 is rotatably immovable, the rod means 70 can be rotated so that its rectangular section 78 will provide rotating force to the disc 60 through the rectangular opening 68 in the disc. Rotation of the disc 60 causes it to threadably move in an axial direction on the rod 70, for example, in a direction toward the guide means 50 to adjust the compressive force of the brake spring 14. Consequently, the brake spring force applied to the armature plate 18 is increased. In this manner, the decrease in the spring braking force, due to the wearing of the friction discs, can be restored. Moreover, the turning of the disc 60 is readily and easily accomplished simply by turning the handle 80 continuously until the compressive force adjustment is sufficient. Since the rod means 70 extends to the exterior of the cover 34, the cover 34 need not be removed to make the adjustment.

The amount of axial movement of the disc 60 and thereby the adjustment in compressive force of the spring 14 can be indicated by the distance of the handle 80 from the cover 34. When the friction disc means are in a new, non-worn condition, the surface of the handle 80 most adjacent to the cover 34 will have a predetermined spacing from the cover 34. As the disc 60 is advanced towards the shoulder 52 of the guide means 50 and the armature 18, the rod 70 will be moved also towards the armature by the guide means 50. The distance between the handle 80 and the cover 34 will therefor decrease and this decreasing distance can be measured to determine the wear life remaining on the friction disc means.

The mechanism 16 can also be used as a simple and effective brake release device. For this purpose, a plate 90 is affixed to the coil casing 6 by means such as bolts 92. The plate 90 includes a cam plate portion 94 having an opening 96 therethrough, a cam surface 98 and a detent 100. The rod means 70 extends through the opening 96 and has a cam follower 110 having two projections 180 degrees apart extending radially from and affixed to the rod means 70 by c-rings 112. The cam follower 110 is mounted in a position opposite the cam surface 98 such that the cam follower will engage the cam surface 98 upon rotation of the rod means 70. The cam surface 98 is positioned circumferentially around the rod means 70 and transversely to the axis of the brake 2. The cam surface 98 is positioned transversely to the axis of the brake 2 and has a contour which varies in axial directions along a camming path from an axial first area 120 toward the guide means 50 and armature 18 to an axial second area 104 in a direction away from the guide means 50 and armature 18. The contour may be continuous so that the camming path extends entirely around the rod means. The axial area 102 of the cam surface 98 axially toward the guide means 50 and armature plate 18 may be considered as a "valley". The detent 100 may be located at the second area of the cam surface 98 which may be at a rotational angle of 90 degrees from the valley in the cam surface 98. The cam follower 110 is positioned during normal operation of the brake 2 in the valley area 102 of the cam surface 98 as shown in FIGS. 1 and 2. In this position, the brake spring 14 bears against the guide means 50 to hold the guide means 50 and the rod means 70 in an axial direction towards the armature 18 and maintain the brake 2 in a brake applied position. In this normal position of the mechanism 16, the brake 2 is released during its regular operation by the electromagnetic force provided by the coil 38, as previously described. In order to release the brake 2 by use of the mechanism 16, the handle 80 is turned to rotate the rod means 70 a fractional portion of one turn and thereby rotate the cam follower 110 away from the first valley area 102 into engagement with the cam surface 98 to the second area 104. Since the cam surface 98 has the axially varying contour as previously described, the bearing of the cam follower 110 against the surface 98 as the follower moves to the second area 104 will cause the rod means 70 and thereby the guide means 50 and spring 14 to move axially away from the armature plate 18 to mechanically release the brake 2 as shown in FIG. 3. Positioning of the cam follower 110 in the detent area 100 will hold the brake 2 in the brake released position. By the operation of this very simple mechanism, the release of the brake is accomplished so that maintenance or any other work desired can be carried out on the motor or the load driven by the motor. Further, the rod means 70 and cam follower 110 can be turned too.

With reference to FIG. 1, when the mechanism 16 is in its normal position in which the cam follower 110 is in the valley area 102 of the cam surface 98, the cam follower 110 is located on the rod means 70 such that the cam follower 110 is spaced from the bottommost part of the valley 102 when the friction discs are in a non-worn condition. As the friction discs wear and the guide means 50 and rod means 70 move axially towards the armature plate and friction discs, the space between the cam follower 110 and the bottom of the valley 102 of the cam surface 98 will decrease. Monitoring of this space can be used as an indication of the amount of wear left on the friction discs before their replacement will be necessary. As shown in FIG. 1, the spacing between the bottom of the valley and the cam follower 110 has a value, for example, of ⅛ inch when the friction discs are in a non-worn position.

Referring now to the alternate embodiment of the invention shown in FIG. 4, those components which are identical to the components of the embodiment of the invention shown in FIGS. 1-3 carry the same identifying numerals. Only those components shown in FIG. 4 which differ from the components of FIGS. 1-3 are identified by different numerals. In FIG. 4, the cylindrical section 118 of the coil casing 6 which is axially away from the armature plate 18 is closed by a wall portion 120. The wall portion 120 has a central opening 122 through which the rod means 70 extends. A donut shaped spacer 124 is positioned between the wall 120 and the axial end 44 of the spring of the brake spring 14 to set the level of the spring compression and the brake torque provided by the brake 2. The brake 2 is moveable to its brake released position to permit maintenance work on the motor or its load by the mechanism 16 described with reference to the embodiment shown in FIGS. 1-3.

A brake adjustment and release mechanism has been disclosed which permits very easy and quick adjustment of the spring brake force of an electromagnetic brake. The wear condition of the brake and the additional brake spring force adjustment available can be readily determined by the position of the mechanism. Release of the brake and holding the brake released for maintenance purposes can also be easily carried out by the mechanism. Moreover, these benefits can be accomplished without the use of special tools and without the need for dismantling or even removing the cover from the brake.

It will be understood that the foregoing description of the present invention is for purposes of illustration only and that the invention is susceptible to a number of modifications or changes, none of which entail any departure from the spirit and scope of the present invention as defined in the hereto appended claims.

What is claimed is:

1. In an electromagnetic brake having an axis, axially positioned friction disc means having a friction surface facing axially, an axially positioned armature having a surface facing and engageable with the disc surface, a brake spring positioned axially and engageable with the armature for applying force to the armature and friction disc in a direction effecting a braking action, electromagnetic means for applying magnetic force to the armature in a direction opposing the brake spring force to compress the spring to a brake released position and effect a brake release action, and a frame for supporting the armature and the electromagnetic means, the combination comprising:

guide means supported by the frame and engaging the brake spring at one axial end of the latter for receiving brake spring force and transmitting such force to the armature and receiving brake release force and transmitting the latter force to the spring;

rod means having a length positioned axially and being movable in an axial direction and also rotatably about the axis in response to turning force;

a circular disc engaging the brake spring at the other axial end of the latter and having an outer threaded periphery, the frame having an axially disposed threaded cylindrical portion in threaded engagement with the circular disc, the disc further including an opening through which the rod means extends and engages the disc, the disc being free to move axially relative to the rod means, the opening and the rod means having a similar non-circular shape at their location of engagement whereby rotation of the rod means rotates and threadably moves the disc in an axial direction to adjust the force of the brake spring on the armature; and cam means including, a cam plate mounted on the frame and having a cam surface with a contour varying in an axial direction along a camming path extending a fractional portion of one turn of the rod means, a cam follower mounted on the rod means, the rod means and cam follower being rotatable said fractional portion of one turn to move the cam follower along the camming path such that the cam follower, the rod means and the guide means move axially to move the brake spring to the brake released position, the cam follower also being rotatable with the rod means along the camming path to permit said rotation of the disc in an axially direction.

2. The combination according to claim 1 wherein:

the cam follower extends radially from the rod means into engagement with the camming path; and the cam surface is positioned circumferentially around the rod means and the camming path extends entirely around the rod means, the rod means and cam follower being rotatable along the camming path through a plurality of turns to rotate the disc and adjust the force on the brake spring.

3. The combination according to claim 2 wherein the cam follower has two projections positioned 180 degrees apart extending radially from the rod means into engagement with the camming path as the rod means rotates.

4. The combination according to claim 1, 2 or 3 wherein the camming path has a detent opposite the second position of the cam follower which is engaged by the cam follower to hold the rod means and cam follower at the second position when the rod means is rotated only said fractional portion of one turn.

5. In an electromagnetic brake having an axis, a brake spring positioned axially for supplying braking force when moved in an axial direction to a brake applied position, friction disc means having a friction surface facing axially, an axially positioned armature having a surface engageable with the disc means surface to effect a braking action in response to the braking force of the brake spring when the latter moves to said brake applied position, the engagement of the armature with the friction surface causing wearing of the friction disc and the reduction of the thickness of the friction disc means, electromagnetic means for applying magnetic force to the armature in a direction opposing the brake spring force to compress the spring to a brake released position and effect a brake release action, and a frame for supporting the brake spring, the armature, and the electromagnetic means, the combination comprising:

guide means supported by the frame and including a section having a side engaging the armature and an opposite side engaging the brake spring at one axial end of the latter for receiving and transmitting the braking force of the brake spring in an axial direction to the armature, the guide means being rotatably immovable when the brake spring is in the brake applied position;

the frame having an axially disposed threaded cylindrical portion;

a circular disc engaging the brake spring at the other axial end of the latter and having a central non-circular opening and an outer threaded periphery in rotatable threaded engagement with the threaded cylindrical portion of the frame, the disc when rotated being movable in an axial direction;

rod means having a length positioned axially and a non-circular cross-section portion similar in shape to and extending through the opening in the disc, the disc being free to move axially relative to the rod means, the rod means further including an end affixed to and rotatable relative to the guide means about the length of the rod means whereby rotation of the rod means relative to the immovable guide means rotates and threadably moves the disc in an axial direction to adjust the force of the brake spring on the guide means and armature; and turning means for rotating the rod means.

6. The combination according to claim 5 further comprising cam means including a cam surface having a contour varying in axial directions and a cam follower affixed to the rod means and movable along the cam surface as the rod means rotates for moving the rod means and guide means in axial directions to move the brake spring between the brake applied and brake released positions.

7. The combination according to claim 5 wherein the engagement of the armature with the friction surface causes wearing of the friction disc means and the reduction of thickness of the friction disc means; and further comprising a cover enclosing the electromagnetic brake and having an opening in axial alignment with the rod means;

the rod means having another end projecting through the opening to the exterior of the cover, the turning means being mounted on said other end; and the turning means has a spacing from the cover determined by the axial position of the brake spring, guide means and rod means as affected by the thickness of the friction disc means, the width of said spacing being indicative of the wear of the friction disc means.

8. The combination according to claim 6 or 7 wherein:
   the cam surface is positioned circumferentially around the rod means;
   the rod means and cam follower being rotatable a fraction of a turn to move the brake spring from the brake applied to the brake released positions, and being further rotatable at least one full turn to move the disc axially and adjust the force of the brake spring, the cam follower and rod means moving axially in a reciprocating manner as they are rotated said full turn and the cam follower moves along the circumferential cam surface.

9. The combination according to claim 8 wherein the cam surface has a detent on its circumference engaging the cam follower and holding the cam follower at a circumferential location corresponding to the brake released position of the brake spring.

10. In an electromagnetic brake having an axis, a brake spring positioned axially for supplying braking force when moved in an axial direction to a brake applied position, friction disc means having a friction surface facing axially, an axially positioned armature having a surface engageable with the friction disc means surface to effect a braking action in response to the braking force of the brake spring when the latter moves to said brake applied position, the engagement of the armature with the friction surface causing wearing of the friction disc means and the reduction of the thickness of the friction disc means, electromagnetic means for applying magnetic force to the armature in a direction opposing the brake spring force to compress the spring to a brake released position and effect a brake release action, and a frame for supporting the brake spring, the armature, and the electromagnetic means, the combination comprising:
   guide means supported by the frame and including a section having a side engaging the armature and an opposite side engaging the brake spring at one axial end of the latter for receiving and transmitting the braking force of the brake spring in an axial direction to the armature, the guide means being rotatably immovable when the brake spring is in the brake applied position;
   the frame having an axially disposed threaded cylindrical portion;
   a circular disc engaging the brake spring at the other axial end of the latter and having a central non-circular opening and an outer threaded periphery in rotatable threaded engagement with the threaded cylindrical portion of the frame, the disc when rotated being movable in an axial direction;
   rod means having a length positioned axially and a non-circular cross-section portion similar in shape to and extending through the opening in the disc, the disc being free to move axially relative to the rod means, the rod means further including an end affixed to and rotatable relative to the guide means about the length of the rod means whereby rotation of the rod means relative to the immovable guide means rotates and threadably moves the disc in an axial direction to adjust the force of the brake spring on the guide means and armature;
   cam means including a cam follower affixed to the rod means and a cam surface having a first valley area axially in a direction towards the guide means and brake spring and a second area axially in a direction away from the guide means and brake spring, the cam follower and the rod means having a first position corresponding to the brake applied position of the brake spring in which the rod means is axially toward the brake spring and the cam follower is opposite and spaced from the first cam surface area and a second position corresponding to the brake released position of the brake spring in which the rod means is axially away from the brake spring and the cam follower is in engagement with the second area of the cam surface, rotating of the rod means moving the cam follower between said first and second positions and also moving the rod means and the guide means axially to move the brake spring between the brake released and brake applied positions; and
   the cam follower at said first position has a spacing from the first cam surface area determined by the axial position of the brake spring, guide means and rod means determined by the thickness of the friction disc means, the width of said spacing being indicative of the wear of the friction disc means.

11. The combination according to claim 10 wherein:
   the cam surface is positioned circumferentially around the rod means; and
   the cam follower extends radially from the rod means.

12. The combination according to claim 10 or 11 wherein the cam surface has a detent at said second area engaging the cam follower when the latter and the rod means are rotated to the second position to hold the rod means and guide means at the second position and the brake spring in the brake released position.

* * * * *